US012522935B2

(12) United States Patent
Liu et al.

(10) Patent No.: US 12,522,935 B2
(45) Date of Patent: Jan. 13, 2026

(54) COPPER-COATED TITANIUM DIBORIDE ARTICLES

(71) Applicant: ALCOA USA CORP., Pittsburgh, PA (US)

(72) Inventors: Xinghua Liu, Murrysville, PA (US); Benjamin D. Mosser, Pittsburgh, PA (US)

(73) Assignee: Alcoa USA Corp., Pittsburgh, PA (US)

( * ) Notice: Subject to any disclaimer, the term of this patent is extended or adjusted under 35 U.S.C. 154(b) by 714 days.

(21) Appl. No.: 17/390,230

(22) Filed: Jul. 30, 2021

(65) Prior Publication Data

US 2021/0355592 A1 Nov. 18, 2021

Related U.S. Application Data

(63) Continuation of application No. PCT/US2021/023935, filed on Mar. 24, 2021.
(Continued)

(51) Int. Cl.
C25C 7/02 (2006.01)
C25C 3/08 (2006.01)
(Continued)

(52) U.S. Cl.
CPC ............... C25C 7/02 (2013.01); C25C 3/08 (2013.01); C25C 3/12 (2013.01); C25D 3/38 (2013.01)

(58) Field of Classification Search
CPC ......... C25C 3/06–24; C25C 7/02; C25C 3/08; C25C 3/12; C25D 3/38
See application file for complete search history.

(56) References Cited

U.S. PATENT DOCUMENTS 3,255,522 A 6/1966 Herbert et al.
4,250,004 A * 2/1981 Miles .................. C25B 11/00
204/290.01
(Continued)

FOREIGN PATENT DOCUMENTS

CN 1440467 A * 9/2003 ............. C23C 18/42
CN 101928854 12/2010
(Continued)

OTHER PUBLICATIONS

International Search Report and Written Opinion, dated Jul. 8, 2021, from corresponding International Patent App. No. PCT/US2021/023935.
(Continued)

*Primary Examiner* — Ciel P Contreras
(74) *Attorney, Agent, or Firm* — Greenberg Traurig, LLP

(57) ABSTRACT

New copper-coated titanium diboride electrodes are disclosed. The copper-coated titanium diboride electrodes may be used in an aluminum electrolysis cell. In one embodiment, a method includes installing the copper-coated titanium diboride electrode in the aluminum electrolysis cell and operating the aluminum electrolysis cell. During start-up, the aluminum electrolysis cell may be preheated and a bath may be formed from a molten electrolyte. Alumina ($Al_2O_3$) may in the added to the bath and reduced to aluminum metal. At least some of the copper film of the copper-coated titanium diboride electrode may be replaced by an aluminum film, thereby forming an aluminum-wetted titanium diboride electrode.

20 Claims, 11 Drawing Sheets

Related U.S. Application Data

(60) Provisional application No. 62/994,675, filed on Mar. 25, 2020.

(51) Int. Cl.
*C25C 3/12* (2006.01)
*C25D 3/38* (2006.01)

(56) References Cited

U.S. PATENT DOCUMENTS

| | | | |
|---|---|---|---|
| 4,338,177 A * | 7/1982 | Withers | C25C 3/06 |
| | | | 204/290.13 |
| 4,650,552 A * | 3/1987 | de Nora | C25C 3/24 |
| | | | 427/431 |
| 6,126,799 A | 10/2000 | Ray et al. | |
| 6,162,334 A | 12/2000 | Ray et al. | |
| 6,217,739 B1 | 4/2001 | Ray et al. | |
| 6,372,119 B1 | 4/2002 | Ray et al. | |
| 6,416,649 B1 | 7/2002 | Ray et al. | |
| 6,423,195 B1 | 7/2002 | Ray et al. | |
| 6,423,204 B1 | 7/2002 | Ray et al. | |
| 6,537,438 B2 | 3/2003 | Christini | |
| 6,758,991 B2 | 7/2004 | DiMilia et al. | |
| 6,821,312 B2 | 11/2004 | Ray et al. | |
| 6,866,766 B2 | 3/2005 | LaCamera et al. | |
| 7,014,881 B2 | 3/2006 | Liu et al. | |
| 7,033,469 B2 | 4/2006 | Weirauch et al. | |
| 7,235,161 B2 | 6/2007 | DiMilia et al. | |
| 8,211,278 B2 | 7/2012 | Weirauch, Jr. et al. | |
| 8,216,536 B2 | 7/2012 | McMillen | |
| 9,181,101 B2 | 11/2015 | Weaver et al. | |
| 9,340,887 B2 | 5/2016 | Liu et al. | |
| D761,199 S | 7/2016 | Hong et al. | |
| 9,771,659 B2 | 9/2017 | Liu et al. | |
| 9,957,627 B2 | 5/2018 | Liu et al. | |
| 10,151,039 B2 | 12/2018 | Liu et al. | |
| 10,407,786 B2 | 9/2019 | DeYoung et al. | |
| 10,415,147 B2 | 9/2019 | Liu | |
| 11,001,931 B2 | 5/2021 | DeYoung et al. | |
| 11,060,199 B2 | 7/2021 | Liu | |
| 11,078,124 B2 | 8/2021 | McMillen et al. | |
| 11,078,584 B2 | 8/2021 | Liu | |
| 11,180,862 B2 | 11/2021 | Liu | |
| 11,203,814 B2 | 12/2021 | Mosser et al. | |
| 2002/0079231 A1 | 6/2002 | Nora et al. | |
| 2004/0163967 A1 | 8/2004 | LaCamera et al. | |
| 2008/0017504 A1 | 1/2008 | Liu et al. | |
| 2011/0024304 A1 | 2/2011 | Weirauch, Jr. | |
| 2016/0230297 A1 * | 8/2016 | DeYoung | C25C 3/12 |
| 2017/0275773 A1 | 9/2017 | Liu | |
| 2018/0009717 A1 | 1/2018 | Mosser et al. | |
| 2019/0127282 A1 | 5/2019 | McMillen et al. | |

FOREIGN PATENT DOCUMENTS

| | | |
|---|---|---|
| CN | 106283125 A | 1/2017 |
| JP | 10-291858 | 11/1998 |
| WO | WO2017/223348 | 12/2017 |
| WO | WO2018/009862 | 1/2018 |
| WO | 2019201724 A1 | 10/2019 |
| WO | WO2020/072541 | 4/2020 |

OTHER PUBLICATIONS

Kvande, H., et al., "the aluminum smelting process and innovative alternative technologies", *J Occup Environ Med.* 56(5):S23-S32, May 8, 2014.

Gost, "Copper of High Purity", Methods of Atomic-Spectral Analysis, USSR Ministry of Non-Ferrous Metallurgy, 1998, 27981.1-88; 31 pages, (machine translation combined with original document).

* cited by examiner

TiB$_2$ ELECTRODE ASSEMBLY, 500

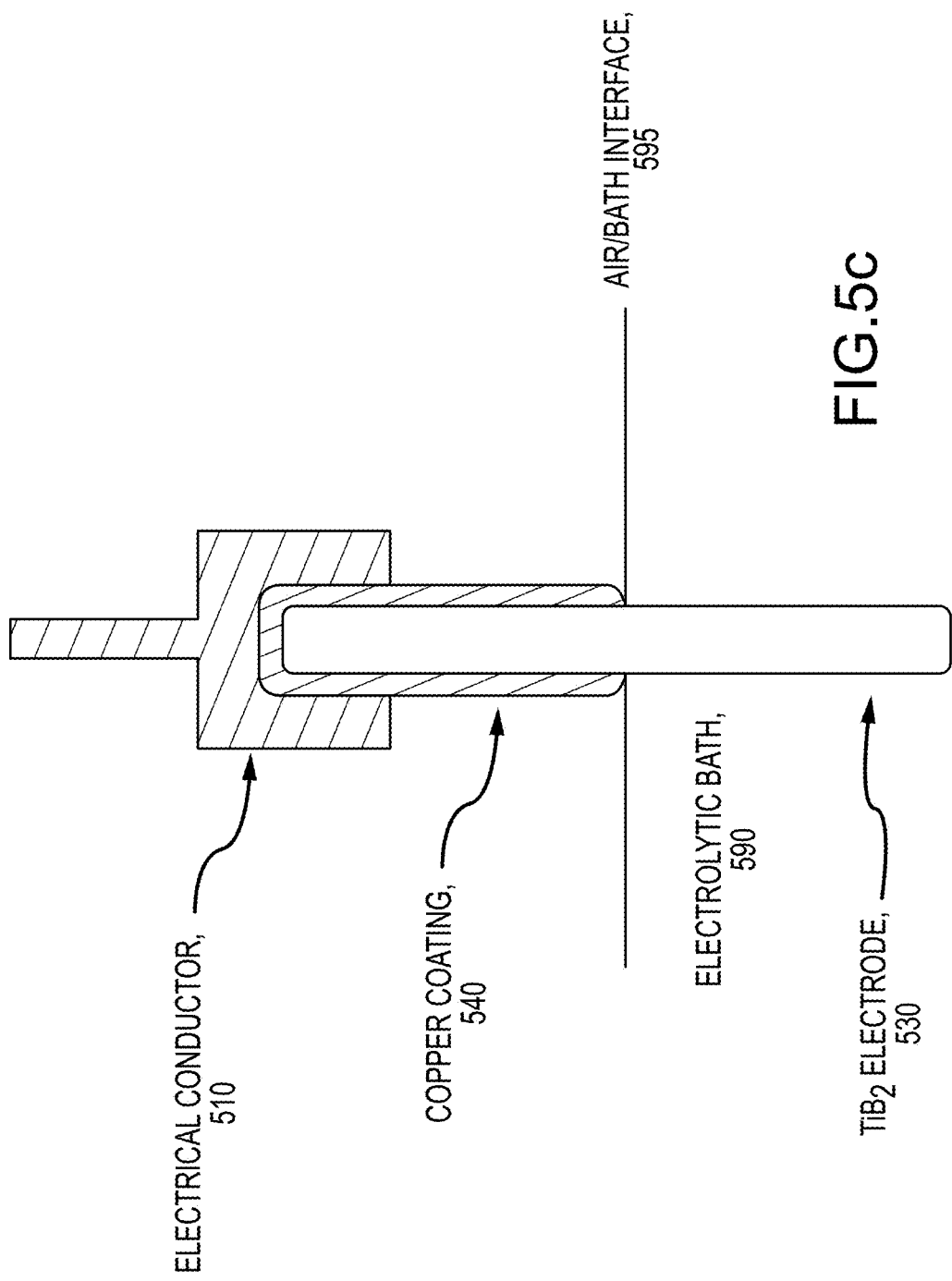

SEM MICROGRAPH (600) OF Cu COATING ON TiB$_2$ ELECTRODE
AFTER EXPOSED AT HIGH TEMPERATURE

Cu COATING: 70-80 um

Cu COATING: ~26 um

Cu coating: ~144 um

COPPER-COATED TITANIUM DIBORIDE ARTICLES

CROSS-REFERENCE TO RELATED APPLICATION

This application is a continuation of International Patent App. No. PCT/US2021/023935, filed Mar. 24, 2021, which claims benefit of priority of U.S. Provisional Patent Application No. 62/994,675, filed Mar. 25, 2020, entitled "COPPER-COATED TITANIUM DIBORIDE ARTICLES", each of which is incorporated herein by reference in its entirety.

BACKGROUND

Titanium diboride ($TiB_2$) is used in a variety of industries, including the aluminum production industry. Commonly-owned U.S. Pat. Nos. 6,537,438, 8,211,278, 8,216,536, 9,181,101, 9,771,659 and 10,407,786 disclose titanium diboride and aluminum electrolysis cells.

SUMMARY OF THE DISCLOSURE

Broadly, the present patent application relates to copper-coated titanium diboride electrodes and methods of making and using the same. Conventional titanium diboride materials may oxidize during start-up and/or during their use in an aluminum electrolysis cell, which causes several issues including low cell operating efficiencies. The copper-coated titanium diboride electrodes disclosed herein facilitate reduced or no oxidation of the titanium diboride electrodes. For instance, the copper-coated titanium diboride electrodes may restrict/eliminate oxidation during start-up of an aluminum electrolysis cell. Further, once the cell has reached a suitable temperature and/or the copper-coated titanium diboride electrodes are suitably submerged in the electrolytic bath, the copper coating may be dissolved, such as by forming metallic copper and/or an Al—Cu alloy via the aluminum produced at or near surfaces of the $TiB_2$ electrodes. The formed metals (e.g., the Al—Cu alloy; the metallic Al or Cu) may drain towards the bottom of the aluminum electrolysis cell (e.g., to the metal pad) and be removed as per normal aluminum metal tapping procedures. Thus, the copper-coated titanium diboride electrodes disclosed herein facilitate improved aluminum electrolysis cell start-up and operations.

I. General Overview

Referring now to FIG. 1, one embodiment of a method (10) for making aluminum in accordance with the present disclosure is disclosed. In the illustrated embodiment, the method (10) includes the steps of making a titanium diboride electrode (100), forming a copper film on the titanium diboride electrode (200), and using the copper-coated titanium diboride electrode in an aluminum electrolysis cell (300). Each of these method steps are described in further detail below.

As may be appreciated, the inventive methods described herein are not limited to this illustrated embodiment. For instance, methods of forming a copper film on the titanium diboride electrode in and of themselves are uniquely inventive and may stand on their own. Similarly, methods of using the copper-coated titanium diboride electrode in an aluminum electrolysis cell are also are uniquely inventive and may stand on their own.

II. Titanium Diboride Electrode Production

Referring now to FIG. 2, in one embodiment, a method includes making (100) a titanium diboride electrode. In one embodiment, the making step (100) comprises sintering (110) a titanium diboride powder, thereby at least partially forming the titanium diboride electrode, e.g., per commonly-owned U.S. Pat. No. 8,211,278. The formed titanium diboride electrode may be of any suitable shape (120). In one embodiment, the formed titanium diboride electrode is in the form of a plate (125). Additional details are provided below.

a. Compositions

In one embodiment, a titanium diboride powder for making a titanium diboride electrode generally comprises titanium diboride ($TiB_2$). In some embodiments, a composition comprises (or consists essentially of, or consist of) titanium diboride and at least one metal additive (e.g., as densification aids), the balance being unavoidable impurities. In some embodiments, the metal additive includes Co, Fe, Ni, and W, among others. In one embodiment, the electrode includes (i) titanium diboride, (ii) from about 0.01 to about 0.75 wt. % metal additives; and (iii) the balance being unavoidable impurities. In one embodiment, the metal additives are selected from the group consisting of Fe, Ni, Co, and W, and combinations thereof. In one embodiment, the electrode includes not greater than about 0.65 wt. % of the metal additives. In other embodiments, the electrode includes not greater than about 0.60 wt. %, or not greater than about 0.55 wt. %, or not greater than about 0.50 wt. %, or not greater than about 0.45 wt. %, or not greater than about 0.40 wt. %, or not greater than about 0.35 wt. % of the metal additives. In one embodiment, the electrode includes at least about 0.025 wt. % of the metal additives. In other embodiments, the electrode includes at least about 0.050 wt. %, or at least about 0.075 wt. %, or at least about 0.10 wt. %, of the metal additives.

In one approach, an electrode include 0.01 to 0.14 wt. % Fe, 0.01 to 0.14 wt. % Ni, 0.01 to 0.14 wt. % Co, and 0.01 to 0.45 wt. % W, the balance being $TiB_2$ and unavoidable impurities, wherein the total amount of metal additives does not exceed 0.75 wt. %. In one embodiment, the electrode includes not greater than 0.10 wt. % each of Fe, Ni, and Co. In another embodiment, the electrode includes not greater than 0.07 wt. % each of Fe, Ni, and Co. In another embodiment, the electrode includes not greater than 0.05 wt. % each of Fe, Ni, and Co. In one embodiment, the electrode includes not greater than 0.30 wt. % W. In one embodiment, the electrode includes not greater than 0.20 wt. % W.

As used herein, "unavoidable impurities" and the like mean constituents that may be included in a composition (e.g., an electrode) other than the metal additives and $TiB_2$ described above. Unavoidable impurities may be included in the composition due to the inherent manufacturing processes used to produce the composition. Examples of unavoidable impurities includes O and C, among others. With respect to oxygen, this element may be present as an impurity in amounts of up to about 2.0 wt. %. In one embodiment, not greater than about 1.5 wt. % O is included in the composition. In other embodiments, not greater than about 1.25 wt. % O, or not greater than about 1.0 wt. % O, or not greater than about 0.75 wt. % O, or not greater than about 0.5 wt. % O, or even less, is included in the composition. In some instance, the oxygen level in an electrode may be approximately 0.5 wt. % so as to avoid abnormal grain growth during production of the electrode.

With respect to carbon, this element may be present as an unavoidable impurity in amounts of up to about 1.0 wt. %. In one embodiment, not greater than about 0.9 wt. % C is included in the composition. In other embodiments, not greater than about 0.8 wt. % C, or not greater than about 0.7 wt. % C, or not greater than about 0.6 wt. % C, or not greater than about 0.5 wt. % C, or even less, is included in the composition.

A mix and match of the metal additives may be incorporated in a composition. For example, a composition may include only one, two or three additives instead of the four described above. In these situations, the additives may be included in the composition in amounts similar to those described above, and the composition may potentially be adjusted to include slightly more of these additives to account for the removal of the other additive(s). In some embodiments, substitutes for Fe, Ni, Co and/or W may be employed, such as Cr, Mn, Mo, Pt, Pd, to name a few. These metal additive substitutes may be employed in addition to, or as a substitute for, the principle metal additives of Fe, Ni, Co, or W.

b. Electrode Fabrication, Shapes and Properties

Electrodes may be fabricated from powders having compositions similar to that described above. In one embodiment, the electrodes may be fabricated using conventional powder sintering processes, such as hot pressing or pressureless sintering, among other powder sintering processes. Sintering is a method of making objects from powder, and includes heating at least one material in a sintering furnace below its solidus or melting point (solid state sintering) and for a time sufficient for the particles of the powder to adhere to one other. Densification aids, such as the metal additives described above, may be incorporated to produce a dense-fired titanium diboride composition body. The densification aids may facilitate sintering by producing a liquid phase during heating, enabling the energy (e.g., temperature and/or pressure) to be lowered and the total amount of metal additives to be reduced/restricted.

With respect to the sintering temperature, the electrodes may be produced by sintering at temperatures of between about 1400° C. to about 2100° C. In some embodiments, the temperature may be in the range of from about 1600° C. to about 2000° C. In one embodiment, pressure assisted densification processes are used to produce the electrodes. In these embodiments, pressures of from about 70 to at least about 350 kg/cm' may be applied during sintering.

As described above, the use of the metal additives in the above-described quantities facilitates densification of the powders into electrodes. In one embodiment, the metal additives are selected such that the produced electrode has a density of from about 80% to about 99% of its theoretical density. The production of electrodes having a density within this range, facilitates long-term use in aluminum electrolysis cells (e.g., using carbon anodes and/or inert anodes). If the density is too high, the electrodes may crack during use in the cell. If the density is too low, the material may not have sufficient durability. In one embodiment, the electrode has a density of at least about 85% of its theoretical density (i.e., ≥3.842 g/cc). In other embodiments, the electrode has a density of at least about 86% (≥3.887 g/cc), or at least about 87% (≥3.932 g/cc), or at least about 88% (≥3.978 g/cc), or at least about 89% (≥4.023 g/cc), or at least about 90% (≥4.068 g/cc) of its theoretical density. In one embodiment, the electrode has a density of not greater than about 98.0% of its theoretical density (≤4.430 g/cc). In other embodiments, the electrode has a density of not greater than about 97.5% (≤4.407 g/cc), or not greater than about 97.0% (≤4.384 g/cc), or not greater than about 96.5% (≤4.362 g/cc), or not greater than about 96.0% (≤4.339 g/cc), or not greater than about 95.5% (≤4.317 g/cc), or not greater than about 95.0% (≤4.294 g/cc) of its theoretical density. In some embodiments, the electrodes have a density in the range of from about 90% to 95% of its theoretical density (4.068 g/cc to 4.294 g/cc), such as from about 91% to 94% of its theoretical density (4.113 g/cc to 4.249 g/cc).

Electrodes having a density of 80-99% of theoretical may have a porosity suitable for use in an aluminum electrolysis cell. Total porosity is related to the percent of the theoretical density. For example, if a material has a density of about 90% of its theoretical density, it has about 10% total porosity (100%-90%=10%). That is, the 100% theoretical density of an object minus the actual density of the object equals its total porosity (TD−AD=TP). The total porosity is the combined amounts of the open (apparent) porosity and the closed porosity (TP=OP+CP). An apparent porosity of a material can be determined via Archimedes principle as embodied in ASTM C373-88 (2006) Standard Test Method for Water Absorption, Bulk Density, Apparent Porosity, and Apparent Specific Gravity of Fired Whiteware Products.

Generally, electrodes produced using the present compositions may realize an apparent porosity of about 0.01 to about 20%. In contradistinction to the conventional wisdom, it has been found electrodes having a high porosity and low density were durable in use in an aluminum electrolysis cell setting, as illustrated in the below examples. In one embodiment, the apparent porosity is in the range of 0.03-10%. In another embodiment, the apparent porosity is in the range of 0.04-5%. In another embodiment, the apparent porosity is in the range of 0.05-4%.

As explained in further detail below, the electrodes may be used as an anode or cathode in an aluminum electrolysis cell. In one embodiment, the electrode is a cathode. In some embodiments, the plates may be used as cathodes in a vertical configuration, a horizontal configuration, or inclined configuration (e.g., drained), among others. In one embodiment, the electrode is wettable, meaning that the produced material during electrolysis (e.g., aluminum) may tend to stick to the surface of the electrode during electrolysis operations.

Products utilizing the disclosed composition may be fabricated into various geometries including tubes, plates, rods, to name a few. The size and shape of the final product may vary, depending on the required electrical and mechanical properties of the electrode within the aluminum electrolysis cell. Examples of electrode plate sizes include square plates having a length/width of about 12 inches and a thickness of about 0.25 inch or 0.5 inch, and rectangular billets having about a 4 inch width, about an 8 inch length, and thickness of about 0.25 or 0.5 inch. In some embodiments, a rectangular plate is about 12 inches in width, about 16 inches in length, and about 0.25 or 0.5 inch thick. In one embodiment, a rectangular plate is about 15 inches in width, about 22 inches in length, and is about 1 or 2 inch thick.

III. Copper Film Production

Referring now to FIG. 3, in one embodiment, a method (10) includes forming a copper film (200) on the titanium diboride electrode. In one embodiment, the copper film is formed via electroless deposition (210), such as by immersing a portion or all of the titanium diboride electrode in a copper-containing bath for a time and temperature sufficient for a film to be deposited thereon. In another embodiment, a copper film is formed via electroplating (220), such as by immersing a portion or all of the titanium diboride electrode in a copper-containing bath for a time and temperature sufficient for a film to be deposited thereon, wherein a current (DC) is applied to the bath.

The film thickness (230) may be any suitable thickness. In one embodiment, the copper film comprises a nominal thickness of from 10 to 200 micrometers. In another embodiment, the copper film comprises a nominal thickness of from 20 to 100 micrometers. FIGS. 8a-8c are SEMs illustrating electrodes having nominal copper film thicknesses of 26, 70-80, and 144 micrometers, respectively.

In one embodiment, the copper film comprises a uniform thickness, where the maximum and minimum thickness of the copper film are within 50% of an average thickness of the copper film. In another embodiment, the uniform thickness is where the maximum and minimum thickness of the copper film are within 25% of an average thickness of the copper film. In yet another embodiment, the uniform thickness is where the maximum and minimum thickness of the copper film are within 10% of an average thickness of the copper film.

In one embodiment, the copper film is continuous and generally covers the outer surface of the titanium diboride electrode. In another embodiment, the copper film is purposefully discontinuous in areas (e.g., upper portions which are used for attachment to an electrolysis cell). In one embodiment, the copper film generally continuously covers at least the bottoms and lower sides of the titanium diboride electrode. In another embodiment, the copper film generally continuously covers at least the bottoms and 70% of the sides of the titanium diboride electrode, wherein the upper portions of the sides are not covered. In another embodiment, the copper film generally continuously covers at least the bottoms and 90% of the sides of the titanium diboride electrode, wherein the upper portions of the sides are not covered.

In one embodiment, a method comprises preparing the titanium diboride electrode for the forming step (200). The preparing may comprise, for instance, at least one of (i) cleaning of the titanium diboride electrode and (ii) rinsing of the titanium diboride electrode. In one embodiment, a method a least includes a cleaning step. In one embodiment, a cleaning step includes contacting the titanium diboride electrode with one or more acids and at temperature of from room temperature to 95° C. In one embodiment, a method at least includes a rinsing step. In one embodiment, the rinsing comprises contacting the titanium diboride electrode with water (e.g., deionized water). After the preparing, the copper film may be formed, as described above.

IV. Use of Copper-Coated Titanium Diboride Electrodes in Aluminum Electrolysis Cells Referring now to FIG. 4, in one embodiment, a method (10) includes using a copper-coated titanium diboride electrode in an aluminum electrolysis cell (300). In one embodiment, a copper-coated titanium diboride electrode is used as an anode. In another embodiment, a copper-coated titanium diboride electrode is used as a cathode. In yet another embodiment, a copper-coated titanium diboride electrode is used as a sidewall. Combinations of these may be used.

In one embodiment, one or more copper-coated titanium diboride electrodes are used to facilitate start-up (310) of an aluminum electrolysis cell. The copper-coated titanium diboride electrodes may be used in lieu of or in combination with other types of electrodes, such as carbon-based electrodes, or inert electrodes. As it relates to start-up (310), in one embodiment, a method may comprise, prior to operating the aluminum electrolysis cell, installing at least one copper-coated titanium diboride electrode in an aluminum electrolysis cell (315) (e.g., by attaching to a support structure of the cell). The start-up (310) may further comprise preheating the aluminum electrolysis cell and forming a bath (320). The start-up (310) may further comprise replacing (325) the copper-film of the titanium diboride electrode with aluminum, thereby forming an aluminum-wetted titanium diboride electrode. For instance, once the cell has reached a suitable temperature and/or the copper-coated titanium diboride electrodes are suitably submerged in the electrolytic bath, the copper coating may be dissolved, such as by forming metallic copper and/or an Al—Cu alloy via the aluminum produced at or near surfaces of the $TiB_2$ electrodes. The formed metals (e.g., the Al—Cu alloy; the metallic Al or Cu) may drain towards the bottom of the aluminum electrolysis cell (e.g., to the metal pad) and be removed as per normal aluminum metal tapping procedures. Thus, the copper-coated titanium diboride electrodes disclosed herein facilitate improved aluminum electrolysis cell start-up and operations. In one embodiment, copper oxides located on surfaces of the copper-coated titanium diboride electrodes are dissolved during start-up (310) (e.g., via the bath).

In one embodiment, a copper-coated titanium diboride electrode is fully submerged in the bath. In another embodiment, a copper-coated titanium diboride electrode is partially submerged in a bath. As shown in FIG. 5c, when partially submerged, a dissolving step may include dissolving a first portion of the copper film (e.g., a lower portion) of the copper-coated titanium diboride electrode. A method may further include maintaining a second portion (540) of the copper film (e.g., an upper portion) of the copper-coated titanium diboride electrode during operation of the aluminum electrolysis cell.

In one embodiment, the starting-up (310) may comprise one or more of the following steps: (i) preheating the aluminum electrolysis cell (e.g., to a temperature of at least 600° C.), (ii) adding a molten electrolyte to the aluminum electrolysis cell, thereby forming a bath, (iii) applying DC current, via the copper-coated titanium diboride electrode, to the bath, (iv) dissolving alumina ($Al_2O_3$) in the bath, (v) reducing the dissolved alumina to aluminum metal, and (vi) replacing at least a portion of the copper film of the copper-coated titanium diboride electrode with an aluminum film, thereby forming an aluminum-wetted titanium diboride electrode, wherein the replacing comprises dissolving at least a portion of the copper film via the aluminum metal of the bath.

After the starting-up period (310), normal cell operations may be conducted (350), wherein aluminum wets the titanium diboride electrode, forming a film thereon and facilitating production of aluminum metal from alumina dissolved in the bath. In one embodiment, the making aluminum metal step comprises using vertically oriented electrodes, such as those illustrated in FIGS. 5a-5c, (described below). In one embodiment, a method includes producing aluminum metal at or near outer surfaces of the vertically oriented, aluminum-wetted titanium diboride electrodes and flowing the aluminum metal down the vertically oriented, aluminum-wetted titanium diboride electrodes. In one embodiment, commercial purity aluminum is produced during normal cell operations (350).

As noted above, in one embodiment, at least one vertical copper-coated titanium diboride electrode is used in an aluminum electrolysis cell. One embodiment of a vertical arrangement is shown in FIGS. 5a-c. As illustrated in FIGS. 5a-5c, a $TiB_2$ electrode assembly (500) may include an electrical conductor (510), a support (520) and one or more copper-coated titanium diboride electrodes (530). The support (520) may be a ceramic. The electrical conductor (510) and copper-coated titanium diboride electrodes (530) may be electrically connected within the support (520). The electrical conductor (510) may be connected to a superstructure of the aluminum electrolysis cell. As illustrated in FIG. 5c, when partially submerged in a bath (590), a first portion of the copper film may be dissolved while a second portion (540) is maintained. The maintained copper film may facilitate enhanced properties of the titanium diboride electrode, such as improved resistance to corrosion. The second portion (540) of the copper film may terminate near an air/bath interface (595).

V. Miscellaneous

These and other aspects, advantages, and novel features of this new technology are set forth in part in the description that follows and will become apparent to those skilled in the art upon examination of the following description and figures or may be learned by practicing one or more embodiments of the technology provided for by the present disclosure.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references, unless the context clearly dictates otherwise. The meaning of "in" includes "in" and "on", unless the context clearly dictates otherwise.

BRIEF DESCRIPTION OF THE DRAWINGS

FIG. 5b is a side view of the electrode assembly of FIG. 5a.

FIG. 5c is a close-up view of an electrode of FIG. 5a disposed in an electrolytic bath.

DETAILED DESCRIPTION

Example 1

Figure 1:
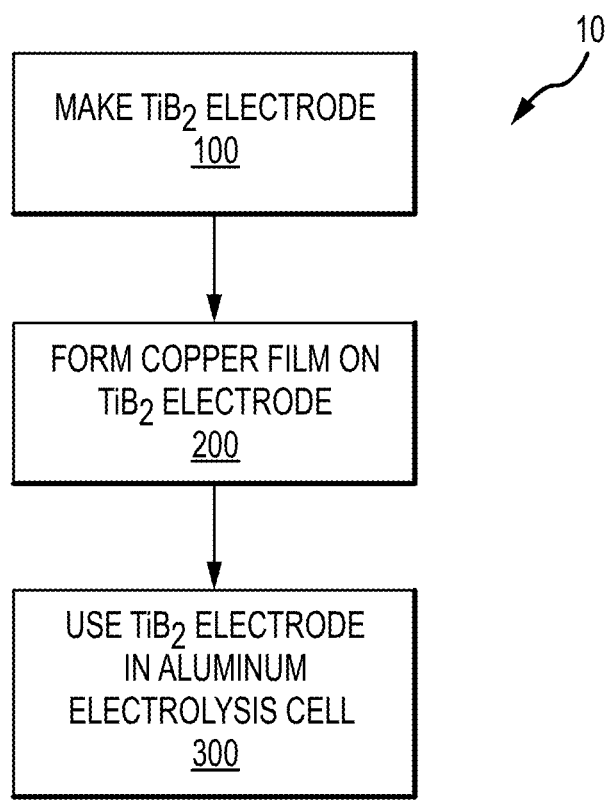
FIG. 1 is a flow chart showing one embodiment of a method for making aluminum in accordance with the present disclosure.
Figure 2:
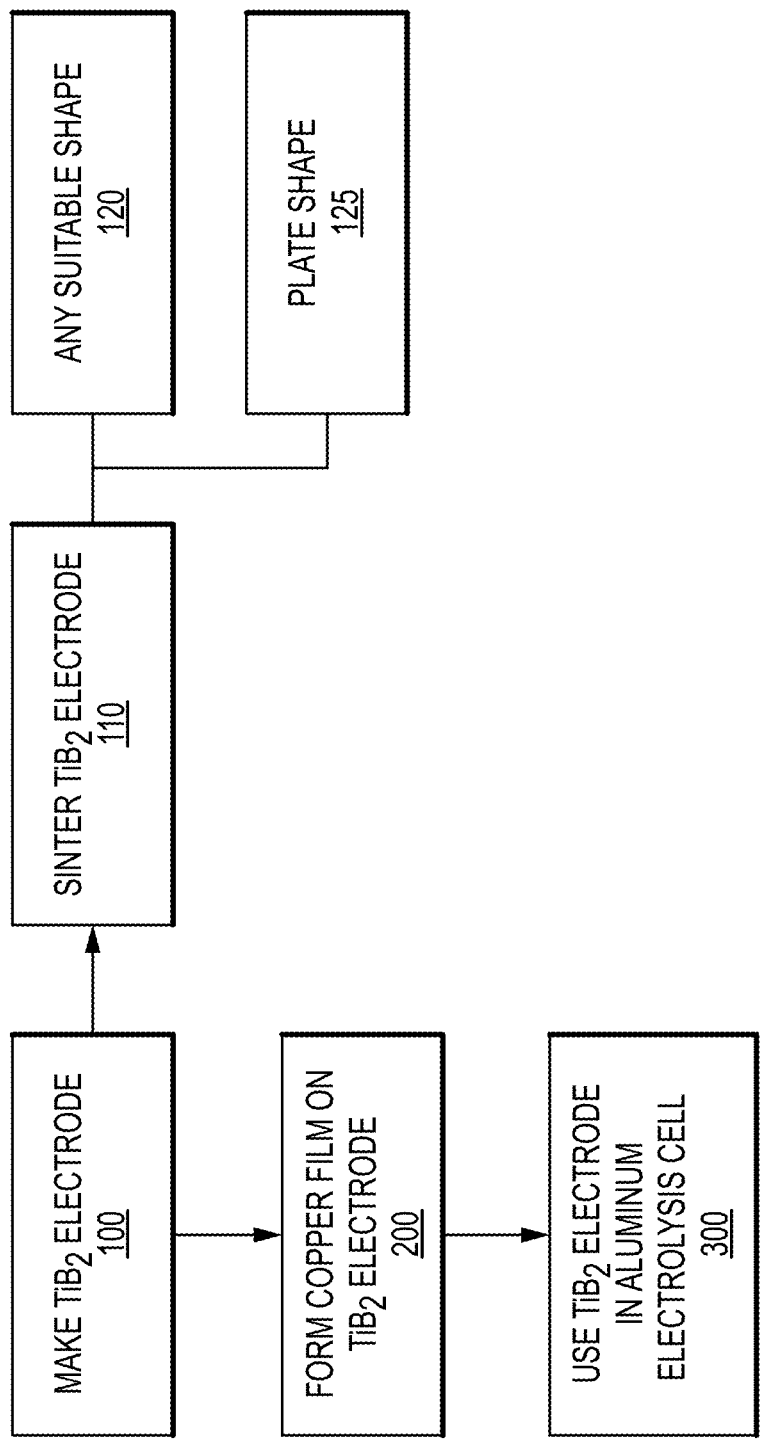
FIG. 2 is a flow chart illustrating one embodiment of the making step (100) of FIG. 1.
Figure 3:
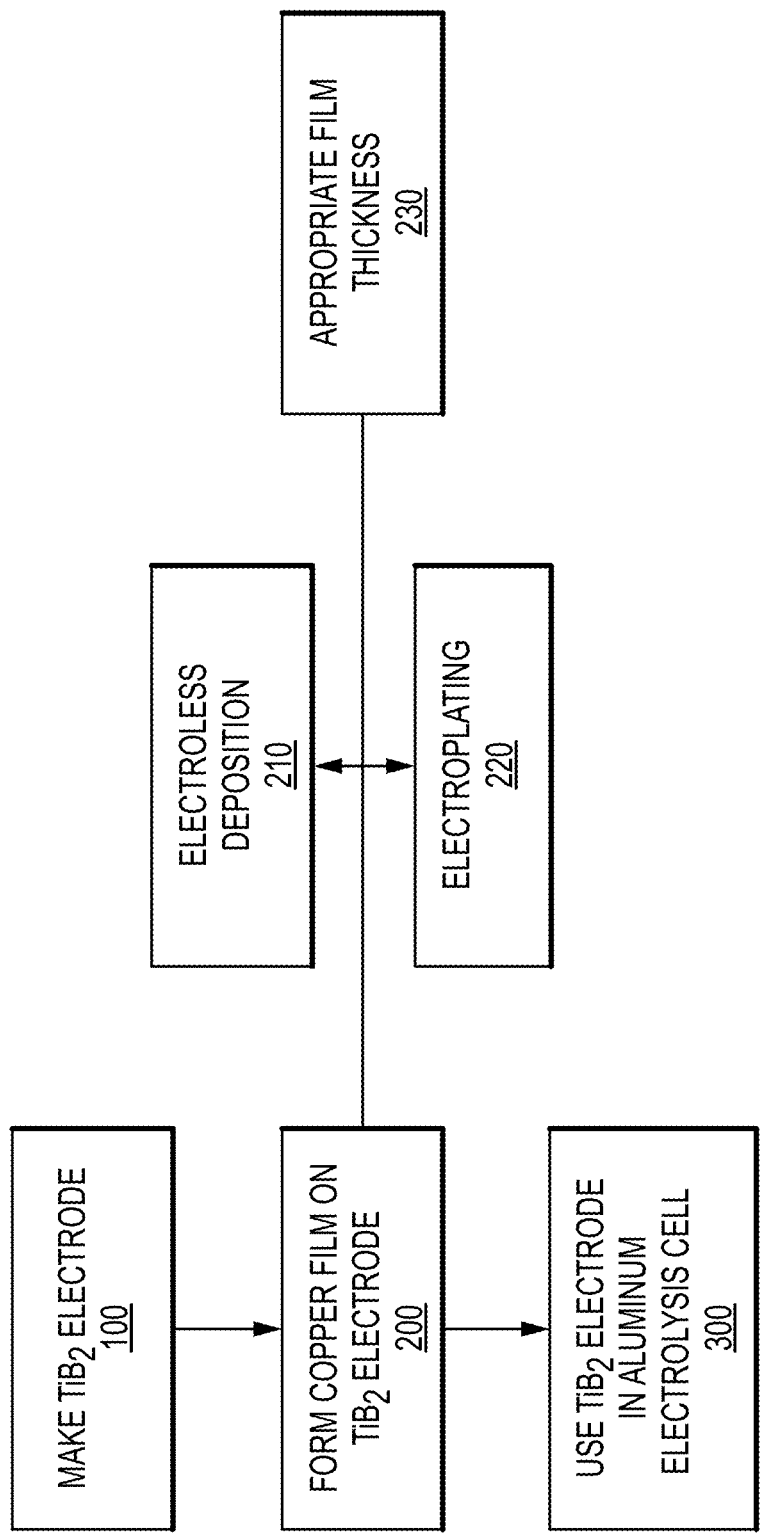
FIG. 3 is a flow chart illustrating one embodiment of the forming step (200) of FIG. 1.
Figure 4:
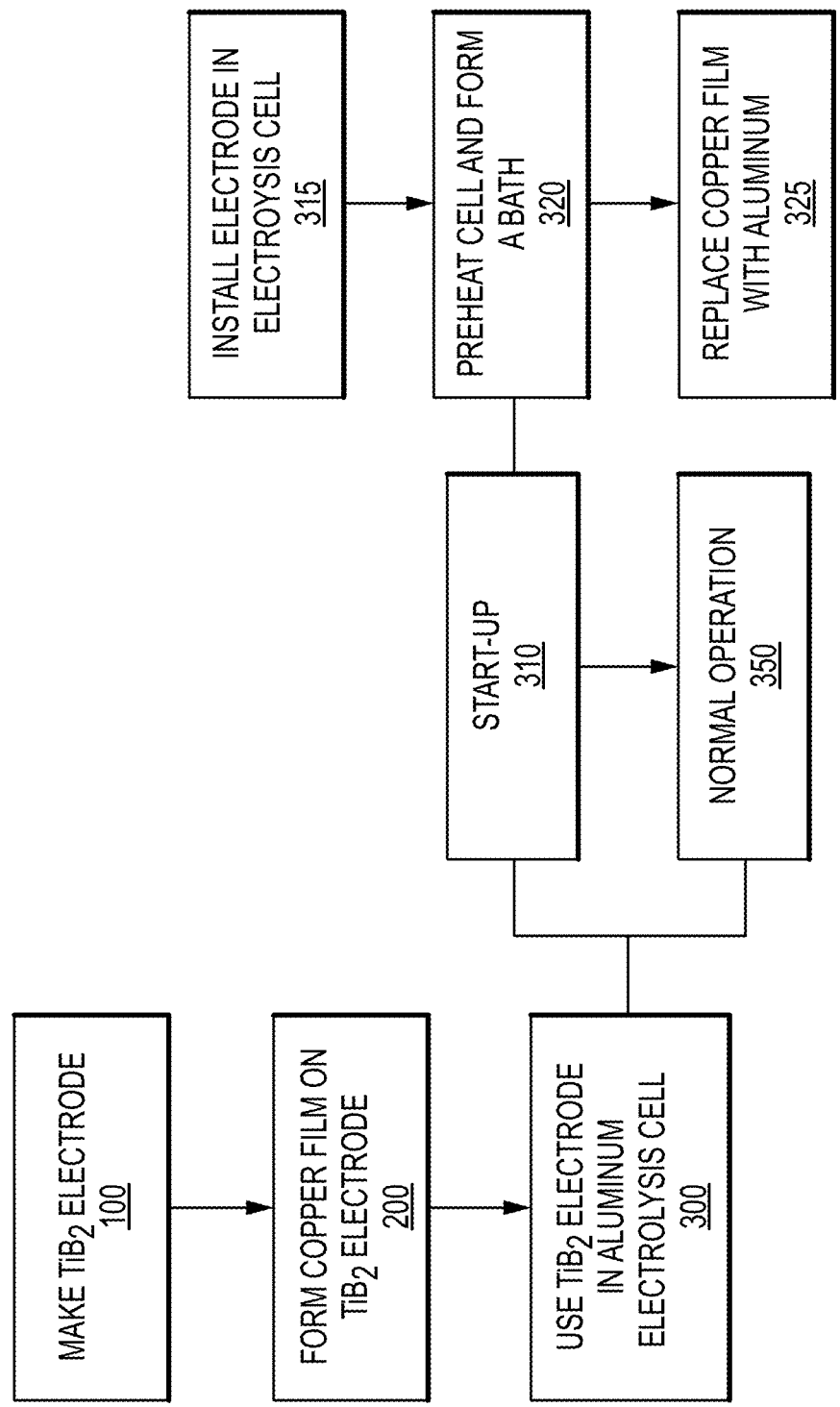
FIG. 4 is a flow chart illustrating one embodiment of the using step (300) of FIG. 1.
Figure 5A:
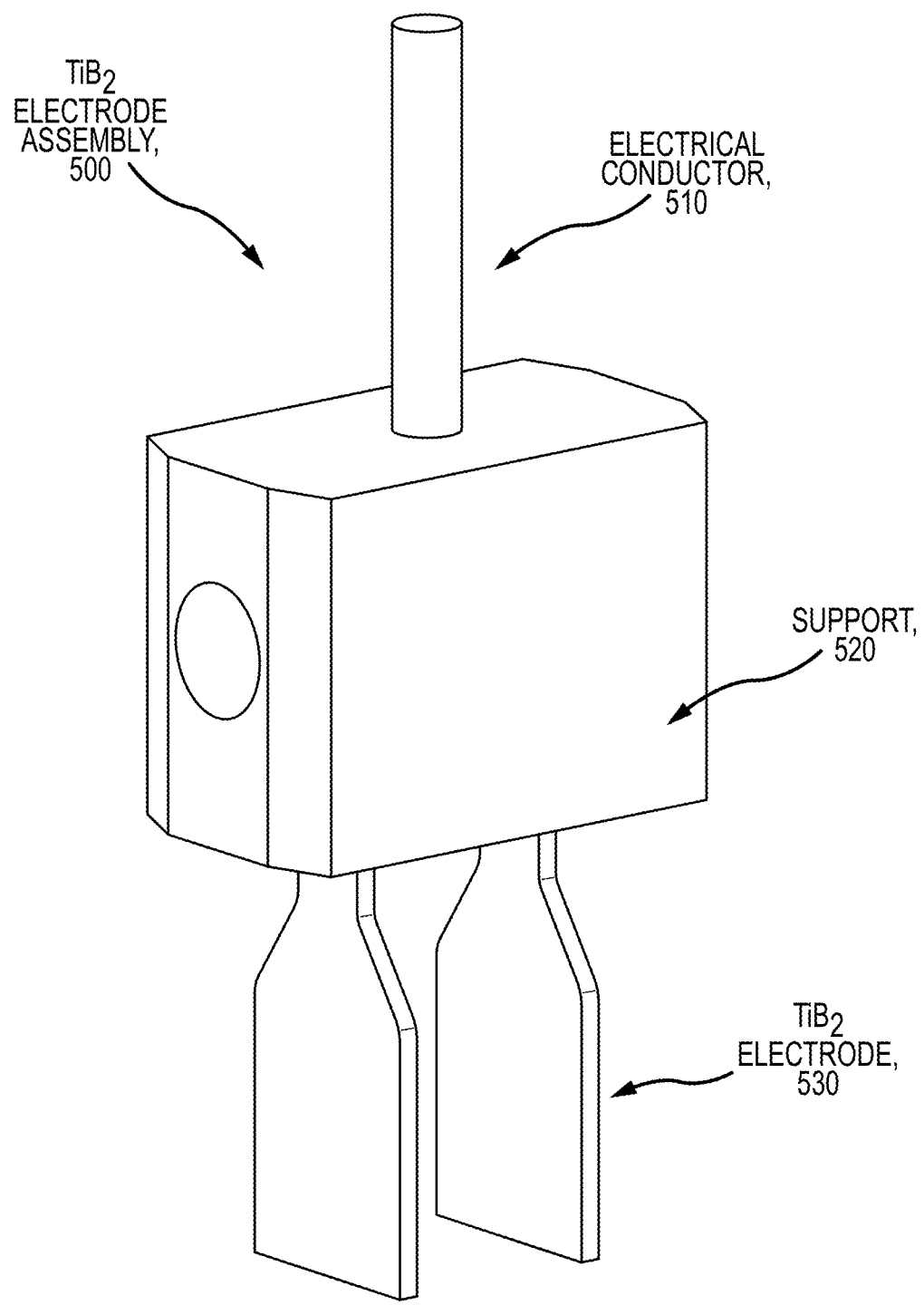
FIG. 5a illustrates one embodiment of a schematic view of a $TiB_2$ electrode assembly useful with an aluminum electrolysis cell comprises a vertical electrode arrangement.
Figure 5B:
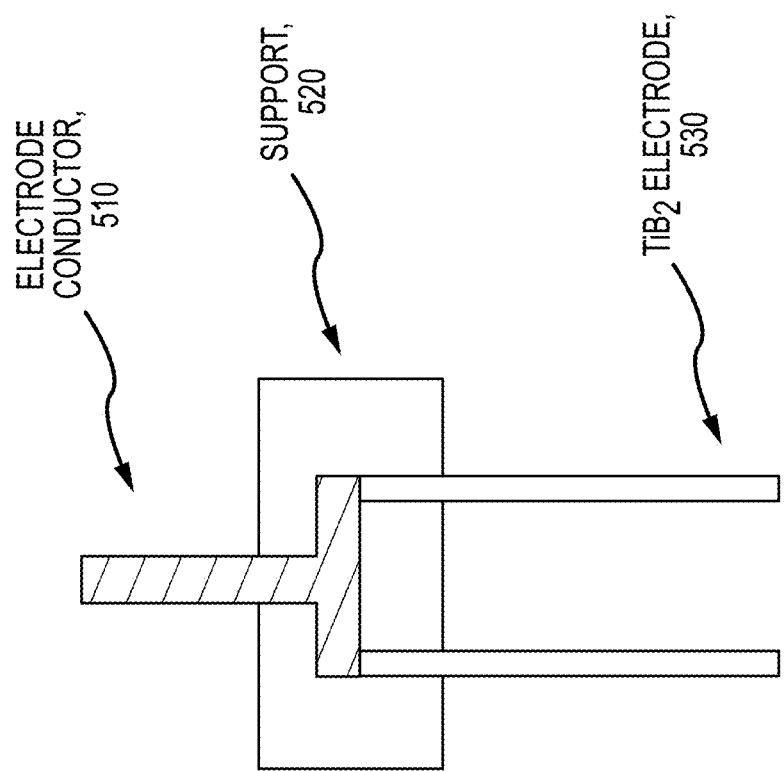
Figure 6:
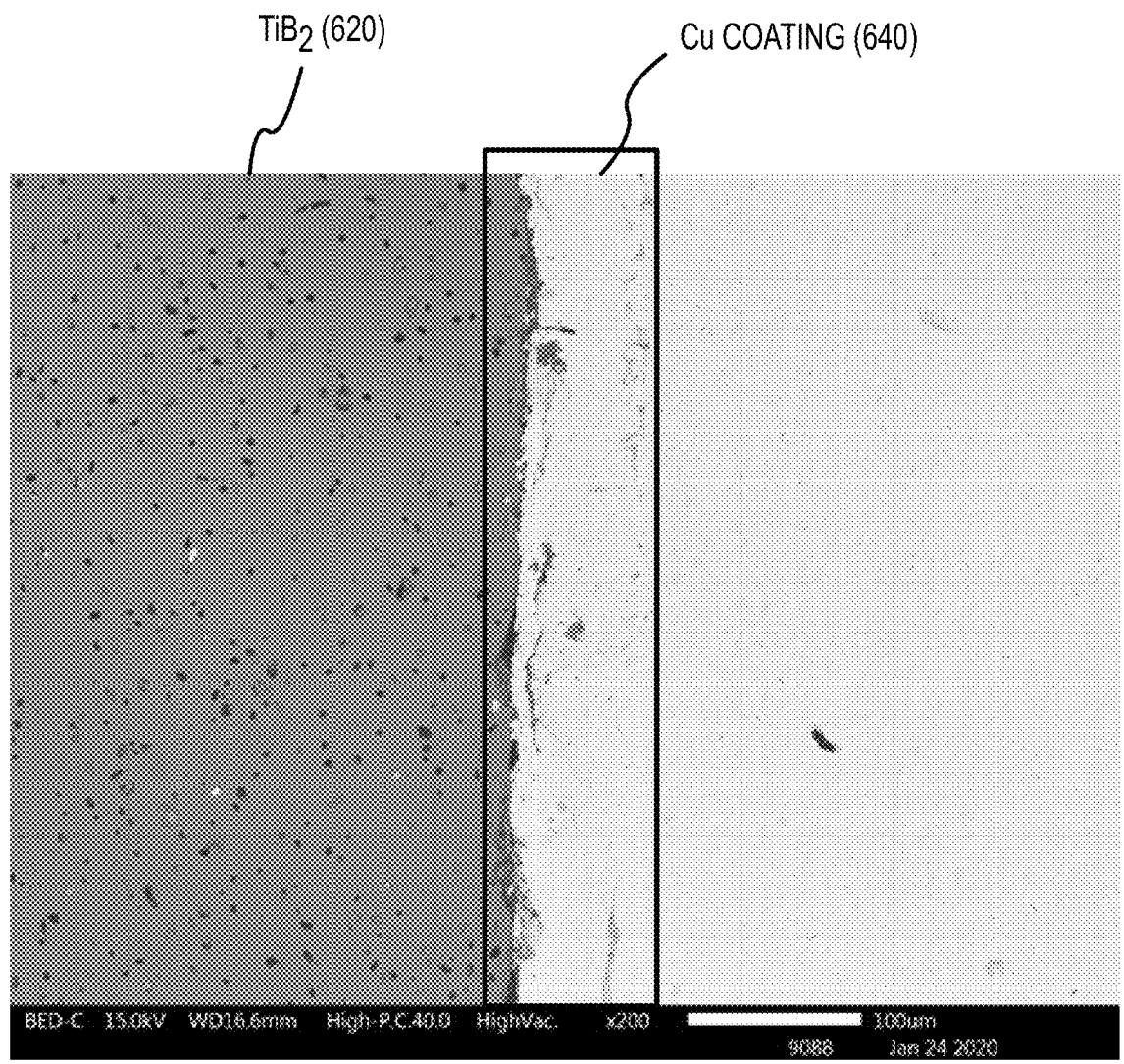
FIG. 6 is an SEM photograph illustrating a copper film on a titanium diboride electrode.
Figure 7A:
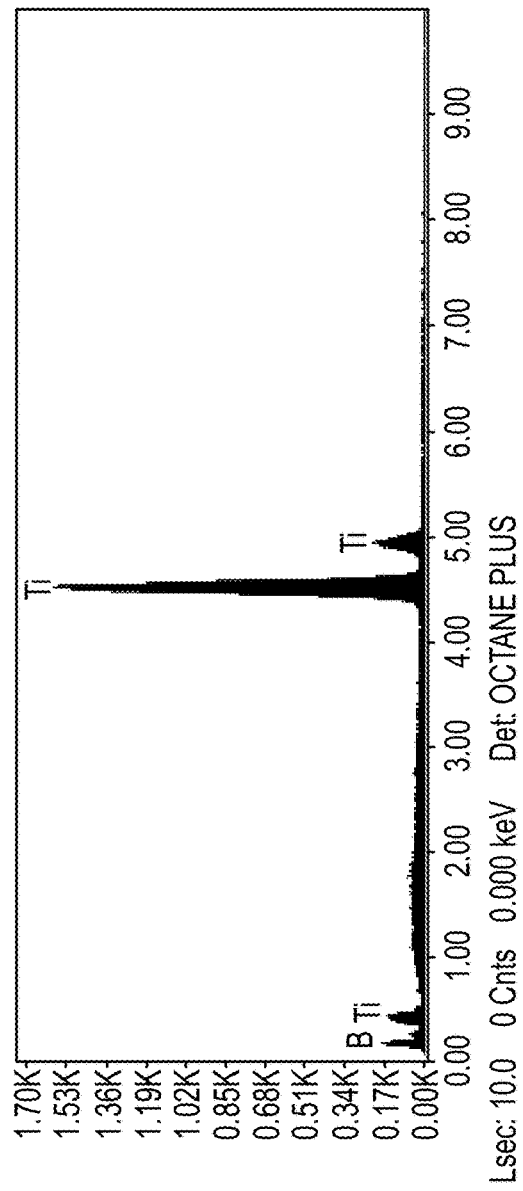
FIGS. 7a-7b are graphs illustrating EDS measurements of the SEM of FIG. 6.
Figure 7B:
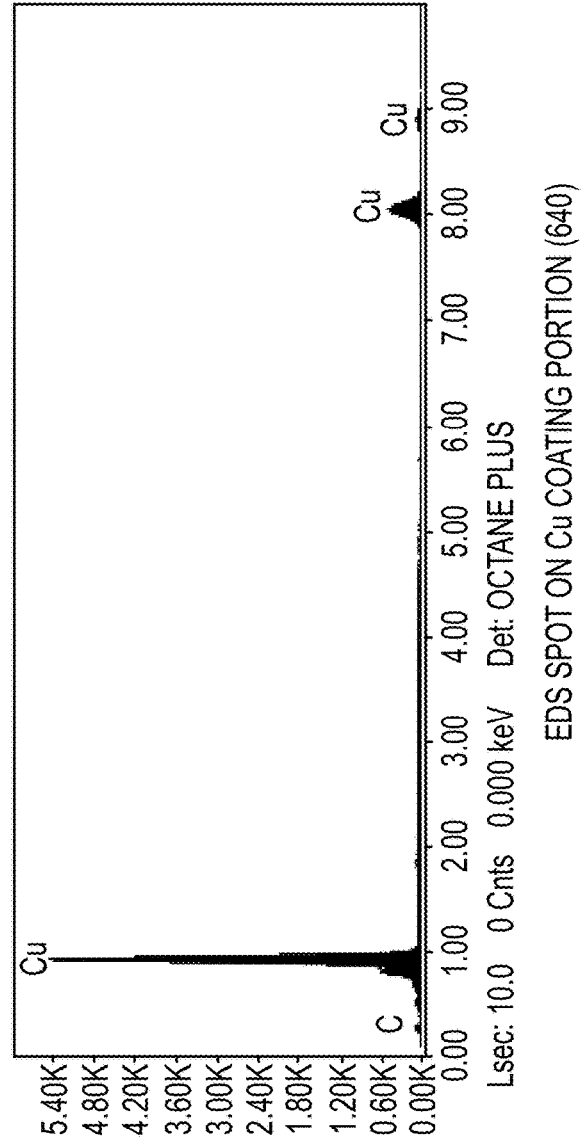
Figure 8B:
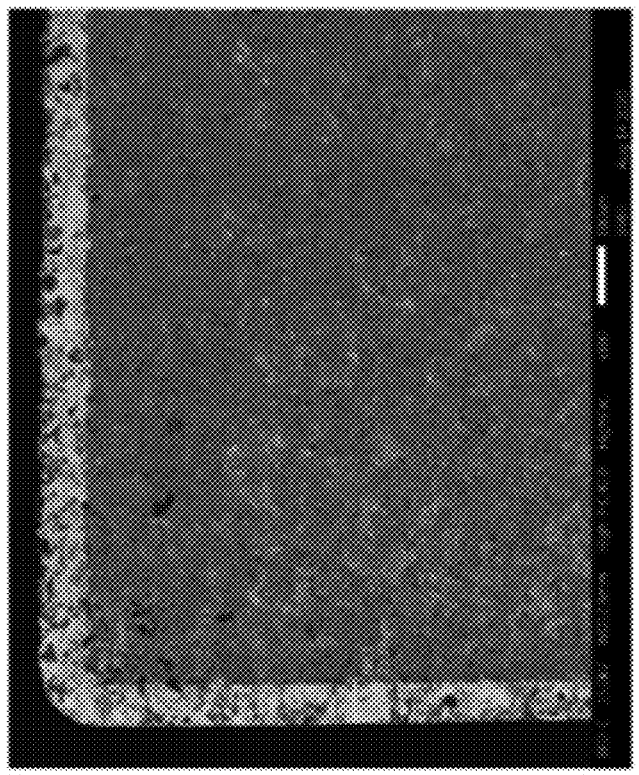
FIGS. 8a-8c are SEMs illustrating electrodes having nominal copper film thicknesses of 26, 70-80, and 144 micrometers, respectively.
Figure 8A:
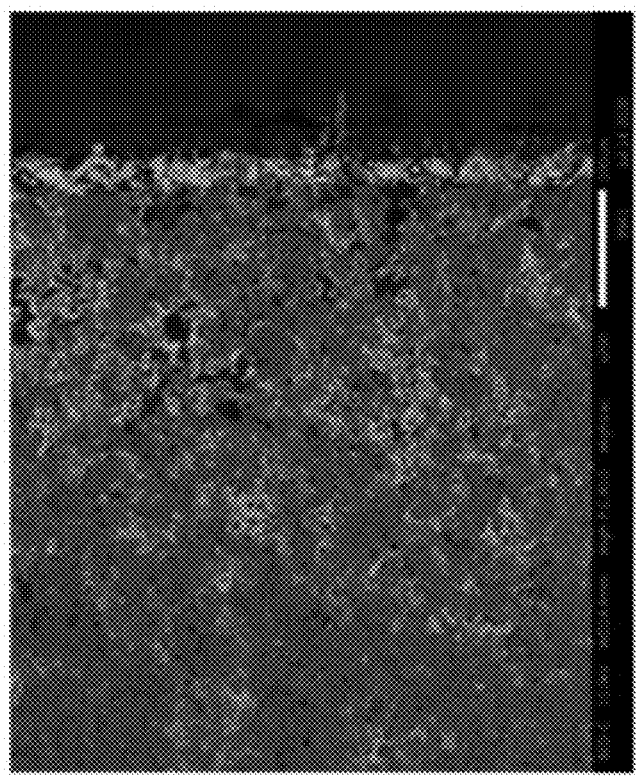
Figure 8C:
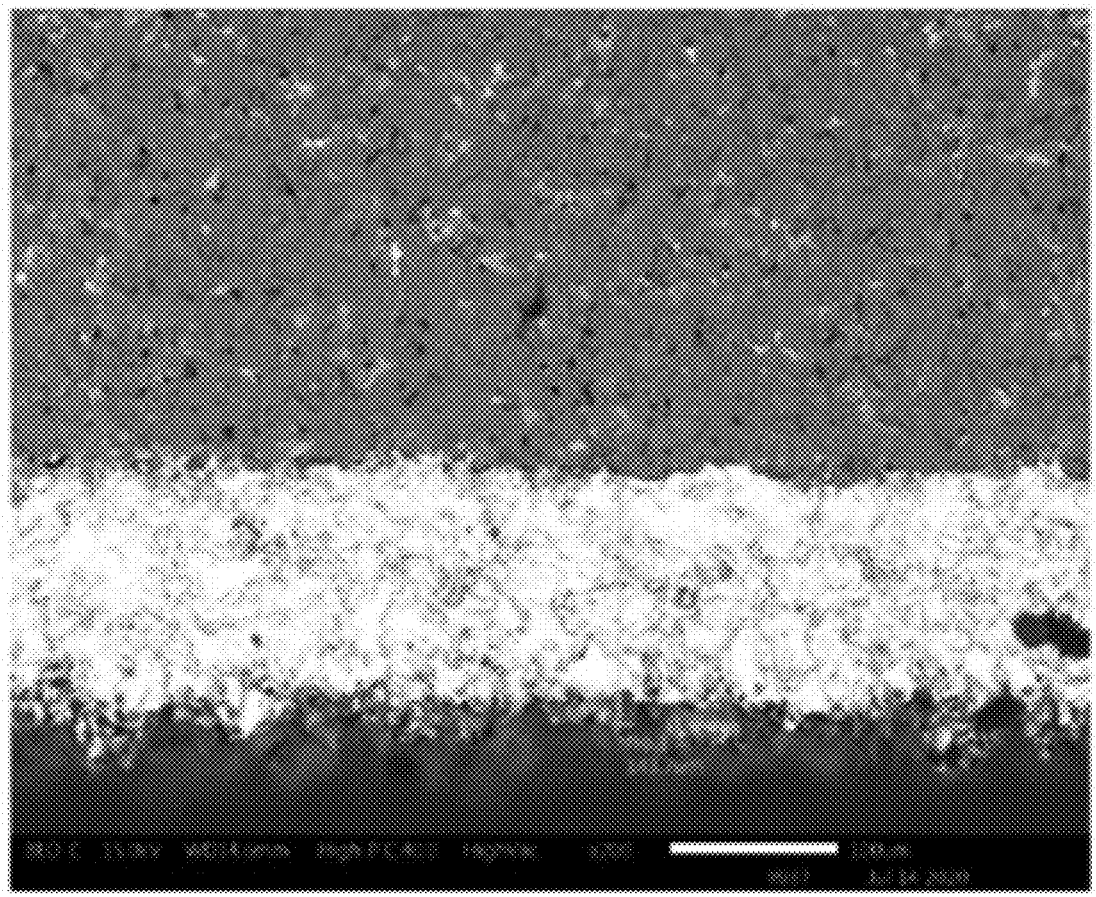

Several titanium diboride electrodes were made in accordance with the description of Section II, above, and commonly-owned U.S. Pat. No. 8,211,278. These titanium diboride electrodes were then cleaned via an acid and rinsed in deionized water, after which the electrode was subjected to electroplating to form a copper film thereon. These titanium diboride electrodes were then used in a pilot-size aluminum electrolysis cell for approximately five days, during which aluminum metal was electrolytically produced. After cell operations concluded, the electrodes were removed from the cells and examined. No visible degradation was seen. An SEM photograph and EDS measurements of one titanium diboride electrode were taken relative to an unsubmerged portion of the electrode (i.e., the part of the electrode that was not submerged in the bath), the results of which are shown in FIGS. 6 and 7a-7b. As shown in the SEM micrograph (600) illustrated in FIG. 6, the copper film (640) is uniform and uninterrupted. Further, the titanium diboride electrode (620) is intact and shows no signs of penetration. As shown in FIGS. 7a-7b, the EDS of the titanium diboride portion (620) shows no signs of contamination and the copper film (640) generally consists of metallic copper.

While a number of embodiments of the present invention have been described, it is understood that these embodiments are illustrative only, and not restrictive, and that many modifications may become apparent to those of ordinary skill in the art. Further still, unless the context clearly requires otherwise, the various steps may be carried out in any desired order, and any applicable steps may be added and/or eliminated.

What is claimed is:

1. A method comprising:
   (a) making a titanium diboride electrode;
      (i) wherein the making comprises sintering of a titanium diboride powder at a temperature of from 1400° C. to 2100° C.;
      (ii) wherein the titanium diboride electrode comprises a density of from 80 to 99% of theoretical and an apparent porosity of from 0.01 to 20%; and
   (b) forming a copper-based film on the titanium diboride electrode, thereby forming a copper-coated titanium diboride electrode;
      (i) wherein the forming comprises at least one of electroless deposition and electroplating of copper onto at least a portion of a surface of the titanium diboride electrode; and
      (ii) wherein the copper-based film predominately comprises copper.

2. The method of claim 1, wherein, after the forming step (b), the copper-based film comprises a nominal thickness of from 10 to 200 micrometers.

3. The method of claim 1, wherein the copper-based film is continuous and at least partially covers the outer surface of the titanium diboride electrode.

4. The method of claim 1, wherein the copper-based film comprises a uniform thickness, wherein a maximum and minimum thickness of the copper-based film are within 50% of an average thickness of the copper-based film.

5. The method of claim 1, comprising:
   preparing the titanium diboride electrode for the forming step (b), wherein the preparing comprises at least one of:
      (i) cleaning of the titanium diboride electrode; and
      (ii) rinsing of the titanium diboride electrode.

6. The method of claim 5, wherein the cleaning step comprises contacting the titanium diboride electrode with one or more acids and at temperature of from room temperature to 95° C.

7. The method of claim 6, wherein the rinsing comprises contacting the titanium diboride electrode with water.

8. The method of claim 1, comprising:
   using the copper-coated titanium diboride electrode in an aluminum electrolysis cell.

9. The method of claim 8, wherein the using comprises using the copper-coated titanium diboride electrode as an anode.

10. The method of claim 8, wherein the using comprises using the copper-coated titanium diboride electrode as a cathode.

11. The method of claim 8, wherein the using comprises using the copper-coated titanium diboride electrode as a sidewall.

12. The method of claim 8, wherein the using comprises:
   prior to operating the aluminum electrolysis cell, installing the copper-coated titanium diboride electrode in the aluminum electrolysis cell; and
   starting-up the aluminum electrolysis cell, wherein the starting-up comprises:
      preheating the aluminum electrolysis cell;
      adding a molten electrolyte to the aluminum electrolysis cell, thereby forming a bath;
      applying DC current, via the copper-coated titanium diboride electrode, to the bath;
      dissolving alumina ($Al_2O_3$) in the bath;
      reducing the dissolved alumina to aluminum metal; and
      replacing at least some of the copper-based film of the copper-coated titanium diboride electrode with an aluminum film, thereby forming an aluminum-wetted titanium diboride electrode, wherein the replacing comprises:
         dissolving at least a portion of the copper-based film via the aluminum metal of the bath.

13. The method of claim 12, comprising:
   after the starting-up step, making commercial purity aluminum in the aluminum electrolysis cell via the aluminum-wetted titanium diboride electrode.

14. The method of claim 13, wherein the using comprises using the copper-coated titanium diboride electrode in a vertical orientation.

15. The method of claim 14, wherein the replacing step comprises:
   producing aluminum metal at or near outer surfaces of the vertically oriented, aluminum-wetted titanium diboride electrode; and
   flowing the aluminum metal down the vertically oriented, aluminum-wetted titanium diboride electrode.

16. The method of claim 12, wherein the preheating the aluminum electrolysis cell comprises heating to a temperature of at least 600° C.

17. The method of claim 12, comprising:
   dissolving, via the bath, copper oxides on surfaces of the copper-coated titanium diboride electrode.

18. The method of claim 12, wherein, during the reducing the dissolved alumina to aluminum metal step, the copper-coated titanium diboride electrode is at least partially submerged in the bath.

19. The method of claim 12, wherein the dissolving step comprises dissolving a first portion of the copper-based film of the copper-coated titanium diboride electrode, wherein the method comprises:
   maintaining a second portion of the copper-based film of the copper-coated titanium diboride electrode during the operating the aluminum electrolysis cell step.

20. The method of claim 1, wherein the titanium diboride electrode consists essentially of titanium diboride.

* * * * *